United States Patent [19]
Garrett

[11] 4,353,210
[45] Oct. 12, 1982

[54] TURBOCHARGER CONTROL VALVE

[76] Inventor: Richard H. Garrett, 2440 Nelson Ave., West Vancouver, British Columbia, Canada

[21] Appl. No.: 264,757

[22] Filed: May 18, 1981

Related U.S. Application Data

[62] Division of Ser. No. 86,238, Oct. 18, 1979, abandoned.

[51] Int. Cl.³ .............................................. F02B 37/12
[52] U.S. Cl. ......................................... 60/602; 251/61
[58] Field of Search ..................... 251/61, 61.3, 61.4; 60/600, 601, 602, 603, 611

[56] References Cited

U.S. PATENT DOCUMENTS

| | | | |
|---|---|---|---|
| 1,879,413 | 9/1932 | Muller | 251/61.3 |
| 2,678,662 | 5/1954 | Boteler | 251/61 |
| 3,421,314 | 1/1969 | Michalke | 60/611 |
| 4,207,742 | 6/1980 | Dommes et al. | 60/602 |
| 4,239,186 | 12/1980 | Pratap | 251/255 |

*Primary Examiner*—Michael Koczo
*Attorney, Agent, or Firm*—Townsend and Townsend

[57] ABSTRACT

A valve comprises a diaphragm and a diaphragm housing with a cover plate peripherally sealed against the diaphragm. The cover plate has a pressure port communicating therethrough for receiving a pressurized fluid. A reciprocable member contacts a side of the diaphragm opposite the cover plate and is reciprocable towards and away from the cover plate. A valve body carries the reciprocable member and has a valve seat and a discharge port therein. A valve closure member is carried by the diaphragm housing. Springs resiliently bias the valve body towards the diaphragm housing so the valve seat is normally in sealing engagement with the valve closure member. The valve closure member is movable away from the valve seat, to permit a fluid to pass between the closure member and the valve seat and out of the discharge port, when the pressure of a fluid from the pressure port against the diaphragm and the pressure of fluid on the closure member are sufficient to deflect the springs.

14 Claims, 4 Drawing Figures

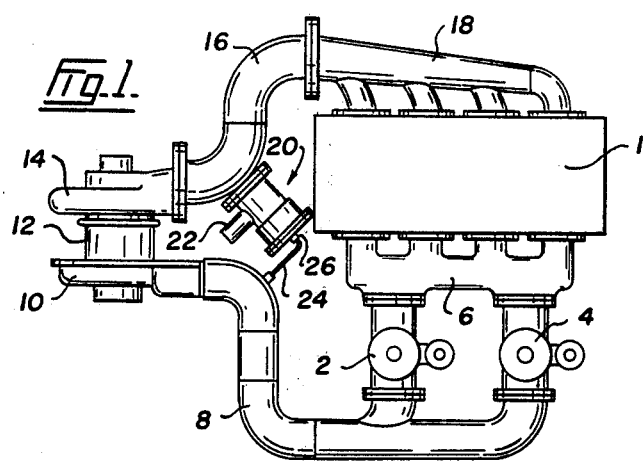
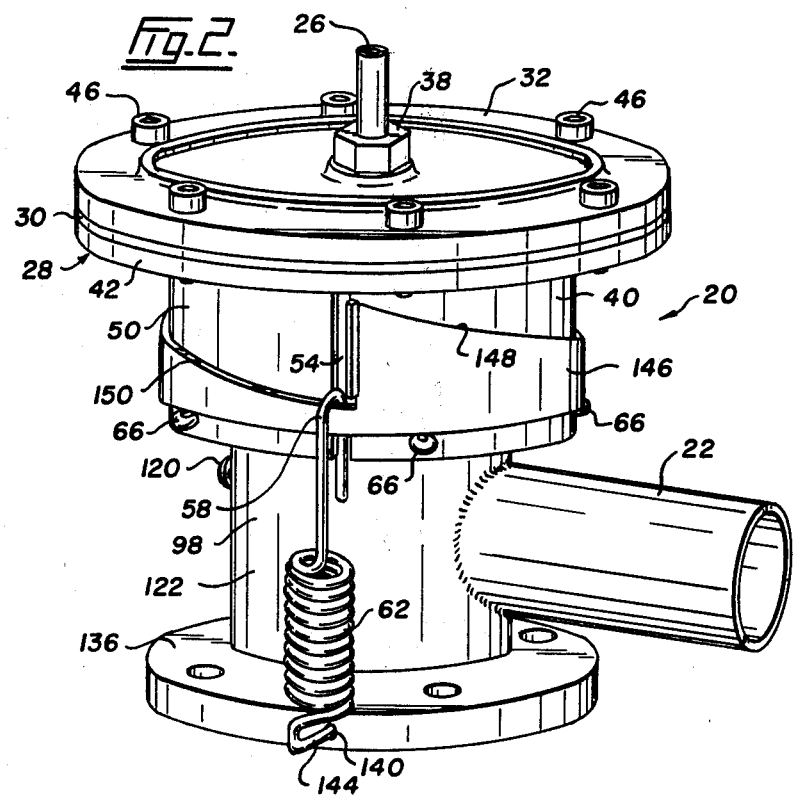

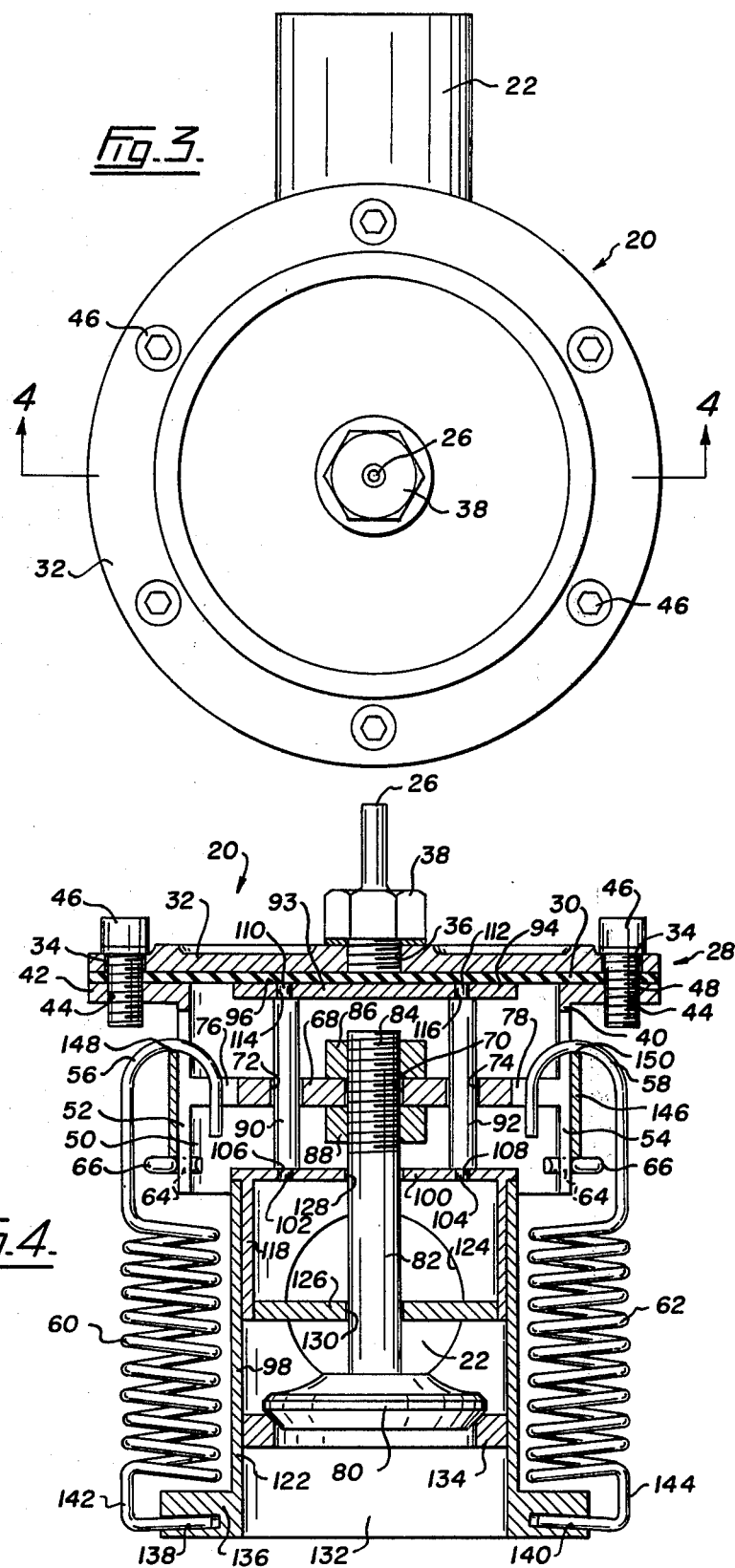

TURBOCHARGER CONTROL VALVE

This is a division of application Ser. No. 86,238, filed Oct. 18, 1979, now abandoned.

BACKGROUND OF THE INVENTION

This invention relates to a control valve suitable for controlling the pressure of exhaust gases entering the turbocharger of an internal combustion engine so as to control the air pressure to the engine.

Many internal combustion engines are turbocharged, predominantly diesel engines, but also including some gasoline engines in recent years. A turbocharger is, in essence, a combined air compressor and gas turbine. The engine's exhaust gases flow though the turbine, rotating it and also the compressor. The compressor supplies high pressure air for the engine so that the air and fuel mixture is at a density above atmospheric pressure. Engine power is directly proportional to the cylinder charge density. A typical turbocharger installation includes a control mechanism for regulating the pressure of air entering the inlet manifold of the engine. One form of control is to throttle, or vent to atmosphere, some of the air from the turbocharger. This type of control is inefficient because the input energy for the turbine is not reduced in proportion to the output of the compressor.

Another form of control is to vent to atmosphere some of the exhaust gases which would otherwise would drive the turbine. This can be accomplished by a simple springloaded release valve. Preferably, however, the venting of the exhaust gases is regulated according to the compressor air pressure. The air pressure is directed to act against a piston or, alternatively, a diaphragm. A diaphragm is preferred because it is cheaper and frequently more reliable than a piston.

Depending upon the fuel system of the engine, some compressors discharge an air-fuel mixture instead of fresh air. In this case, it is important that the valve motor be leakproof to avoid the fire hazard of an escaping air-fuel mixture, gumming of the valve stem and dilution of the air-fuel mixture for the engine.

As for any control system, it is desirable to achieve stability, that is, to use a valve action which seeks equilibrium, rather than one which prevents it. For a lift valve, also called a poppet valve, the alternatives are to open the valve into an exhaust stream or move the valve away from it. If the valve opens into the exhaust stream, the pressure of the exhaust gases interfers with the opening of the valve, and the opening of the valve causes a sudden pressure loss which causes the valve to close. Consequently, the valve must move away from the exhaust stream for stable action. Normally, this requires the valve motor to pull the valve towards it, and thus a piston or a diaphragm may utilize a connecting rod passing through a gland. To design a gland and piston which are leakproof is not impossible, but a reliable and heat resistant valve of this type is usually expensive.

It is therefore desirable to provide a valve which uses a non-perforated diaphragm and a glandless action, yet has the following desirable characteristics:
(1) Leakproof construction;
(2) Stable action;
(3) Accuracy over a fairly wide flow range;
(4) Reliability;
(5) Durability;
(6) Compact size and convenient shape for mounting;
(7) Adjustability; and
(8) Inexpensive construction.

In earlier U.S. patents, valves employing nonperforated diaphragms and pressure plates on the opposite side of the diaphragm from the pressure inlet include U.S. Pat. Nos. 1,921,551 to Temple and 1,879,413 to Muller. These valves are, however, relatively complex and are not adapted for such uses as turbocharger control. Other control valves are found in U.S. Pat. Nos. 3,421,314 to Michalke, 4,130,266 to Bertling and 4,135,697 to Brumm.

SUMMARY OF THE INVENTION

According to the invention, a valve comprises a diaphragm and a diaphragm housing having a cover plate peripherally sealed against the diaphragm. The cover plate has a pressure port communicating therethrough for receiving a pressurized fluid. A reciprocable member contacts a side of a diaphragm opposite the cover plate and is reciprocable towards and away from the cover plate. A valve body carries the reciprocable member and has a valve seat and a discharge port therein. A valve closure member is carried by the diaphragm housing. Resilient means biases the valve body towards the diaphragm housing and biases the valve seat into sealing engagement with the closure member. The valve closure member is movable away from the valve seat, to permit a fluid to pass between the closure member and the valve seat and out the discharge port, when the pressure of fluid from the pressure port against the diaphragm and the pressure of fluid against the closure member are sufficient to deflect the resilient means.

By mounting the reciprocable member on the valve body and connecting the valve closure member to the diaphragm housing, the present invention offers a valve which fully meets the design criteria for such purposes as turbocharger control and which can be relatively uncomplicated and inexpensive in construction. A valve according to the invention can be glandless for maintenance-free operation and can take advantage of an unperforated diaphragm. At the same time, the operation of the valve is stable since the closure member moves inwardly to open the valve, rather than outwardly. Other advantages of the invention are outlined with respect to the preferred embodiment described below.

BRIEF DESCRIPTION OF THE DRAWINGS

FIG. 1 is a plan view of an internal combustion engine which is equipped with a turbocharger and controlled by a valve according to an embodiment of the invention;

FIG. 2 is an isometric view of the valve of FIG. 1;

FIG. 3 is a top plan view of the valve; and

FIG. 4 is a sectional view taken along line 4—4 of FIG. 3.

DESCRIPTION OF THE PREFERRED EMBODIMENTS

FIG. 1 illustrates a conventional internal combustion engine 1 provided with a pair of carburetors 2 and 4 connected to the intake manifold 6. A conduit 8 is provided for supplying pressurized air to the carburetors from the compressor 10 of a turbocharger 12. In the conventional manner, the turbine 14 of the turbocharger 12 is driven by exhaust gases passing through conduit 16 from the exhaust manifold 18 of the engine 1.

The operation of the turbocharger 12 is controlled by the turbocharger control valve 20, connected to conduit 16, which can vent a portion of the exhaust gases to atmosphere through its discharge port 22. The valve 20 regulates the discharge according to the pressure of air from the compressor. Conduit 24 connects conduit 8 to the pressure port 26 of valve 20.

The details of valve 20 are better seen in the remaining FIGS. 2 to 4. The valve 20 includes a diaphragm housing 28 for the disc-shaped diaphragm 30. Diaphragm 30 may be made of a suitable synthetic rubber such as Buna-N (trade mark) with nylon reinforcing.

The diaphragm housing 28 includes a disc-shaped cover plate 32 with a plurality of apertures 34 near its periphery and a threaded central aperture 36 for receiving the fitting 38. The pressure port 26, for the pressurized air from compressor 10, extends through fitting 38 and cover plate 32 to the diaphragm 30.

The diaphragm housing 28 also comprises an annular portion 40 which extends away from the diaphragm 30 and the cover plate 32. Annular portion 40 has an mounting flange 42 which includes a plurality of tapped apertures 44. A plurality of bolts 46 are received in apertures 44 of flange 42 and apertures 34 of cover plate 32 and pass through the apertures 48 of diaphragm 30. Flange 42 and bolts 46 peripherally seal diaphragm 30 against cover plate 32.

Portion 40 of diaphragm housing 28 has an annular side wall 50 provided with a pair of diametrically spaced-apart, vertically elongate slots 52 and 54 for receiving the hooked ends 56 and 58 of the coil springs 60 and 62. Four apertures 64 extend through the side wall 50, near the open end thereof, for receiving cotter pins 66 used for a purpose described below.

A disc-shaped support member 68 extends internally across the annular portion 40 of diaphragm housing 28 and is spaced-apart from diaphragm 30. Support member 68 has a central aperture 70, a pair of diametrically spaced-apart apertures 72 and 74 and a pair of notches 76 and 78 for accomodating the ends 56 and 58 of the coil springs 60 and 62. Central aperture 70 is provided to carry a valve closure member or poppet valve 80. The valve stem 82 of valve 80 has a threaded end 84 extending through aperture 70, and a pair of nuts 86 and 88, on opposite sides of member 68, secure valve stem 82 to the support member 68. In this way, valve 80 is connected to the support member and extends perpendicularly away from diaphragm 30.

Apertures 72 and 74 are provided in support member 68 for slidably receiving a pair of stems 90 and 92 which comprise connecting portions of the reciprocable member 93. Pressure plate 94 of member 93 has a flat surface 96 which contacts the side of diaphragm 30 opposite cover plate 32. A movement of diaphragm 30, caused by varying pressure of fluid received through pressure port 26, causes pressure plate 94 to reciprocate towards or away from the cover plate 32. By means of stems 90 and 92, member 93 is carried by valve body 98. Valve body 98 comprises a hollow cylinder with a closed, disc-shaped end 100. The ends 102 and 104 of stems 90 and 92, having reduced diameters, are received within the corresponding apertures 106 and 108 of valve body 98 and the stems are tack welded thereto. The opposite ends 110 and 112 of stems 90 and 92 also have reduced diameters and are received within the apertures 114 and 116 of pressure plate 94. These ends are not tack welded to reduce the transmission of heat from the stems to the pressure plate.

The disc-shaped end 100 of valve body 98 has an annular flange 118 extending internally into body 98. A screw 120 is threadedly received within corresponding apertures of side wall 122 of valve body 98 and the flange 118. This retains end 100 on the valve body 98. Flange 118 has a semi-circular recess 124 so as not to interfere with the discharge port 22 of valve body 98.

A bar-shaped support member 126 extends diametrically across annular flange 118 at the end opposite the disc-shaped end 100. The aperture 128 in the disc-shaped end 100, and the aperture 130 in support member 126, slidably receive valve stem 82 and provide twin support points for valve 80. This type of valve guide is preferred to a sleeve-type guide, since it is less prone to fouling which could cause the valve to stick.

Valve body 98 has an open end 132 and a valve seat 134, for the lift or poppet valve 80. When pressurized fluid is introduced into pressure port 26, the pressure tends to lift cover plate 32 away from diaphragm 30 and pressure plate 94. The pressure against pressure plate 94 is transmitted to valve body 98 through stems 90 and 92. The pressure against cover plate 32 lifting housing 28 is transmitted to valve 80 through support member 68 and tends to lift the valve off of seat 134.

Mounting flange 136 is provided with a pair of diametrically spaced-apart, inclined sockets 138 and 140 for receiving the ends 142 and 144 of the coil springs 60 and 62. Coil springs 60 and 62 act as resilient tension springs for biasing valve body 98 towards diaphragm housing 28. The fluid entering pressure port 26 plus the pressure of exhaust gases from conduit 16 on poppet 80 must generate a force sufficient to overcome the tension of springs 60 and 62 before valve 80 is lifted away from valve seat 134.

The exterior position of springs 60 and 62, relative to valve body 98 and diaphragm housing 28, provides a convenient means for adjusting the resiliency or tension of springs 60 and 62. For this purpose, an annular member 146 is rotatably received about the annular flange 50 of diaphragm housing 28. The cotter pins 66, already mentioned, retain member 146 in place. Member 146 has a pair of sloping edges 148 and 150 for receiving the hooked-shaped ends 56 and 58 of springs 60 and 62 which then extend into the slots 52 and 54 of housing 28. By rotating member 146 in one direction, ends 56 and 58 are moved along slots 52 and 54 towards diaphragm 30, increasing the tension of springs 60 and 62. Rotation in the opposite direction moves ends 56 and 58 of springs 60 and 62, respectively, closer to their opposite ends 142 and 144, and thereby decreases the tension in the springs. In this way, the pressure of fluid against diaphragm 30 and cover plate 32 required to unseat valve seat 34 from valve 80 can be adjusted.

In operation, all of the exhaust gases from conduit 16 normally pass to turbine 14 of turbocharger 12 when valve 20 is closed, since valve seat 134 is normally in sealing engagement with valve 80. Pressurized air from conduit 8 passing through conduit 24 enters pressure port 26 and acts against diaphragm 30 and cover plate 32. Diaphragm housing 28, including cover plate 32, moves away from reciprocable member 93 and valve body 98 moves away from valve seat 134. However, this only occurs when the pressure of air against diaphragm 30 and cover plate 32 plus the pressure of exhaust gases on poppet 80 are sufficient to overcome the tension of springs 60 and 62. As already mentioned, this pressure can readily be adjusted by rotating member 146. Once the valve opens, a portion of the exhaust gases can pass between valve 80 and seat 134 and exits through discharge port 22. This prevents the pressure of exhaust gases from driving the turbocharger at a speed corresponding to an excessive compressor pressure.

When compared with earlier valves, valve 20 offers significant advantages. Firstly, valve 20 is simple and compact and the valve can be fabricated without the need of any complicated castings. The reliability of the valve is improved by the simple mechanism employing no complex linkages. For example, some earlier turbocharger valves use a complicated bell crank linkage to achieve the glandless action.

The leakage of air or an air-fuel mixture from conduit 8 is completely prevented since the working area of diaphragm 30 is unperforated. At the same time, the inward movement of valve 80, as required for a stable valve action, is achieved without the need of packing glands, components which commonly fail. This glandless action is achieved by carrying the pressure plate 94 on the valve body 98. Since valve 80 is carried by support member 68 of diaphragm housing 28, pressurized air between diaphragm 30 and valve cover 32 moves cover plate 32 away from pressure plate 94 and thereby lifts valve 80 away from valve seat 134. The action of valve 20 is accurate over a fairly wide flow range. The force per unit of deflection is relatively low as determined by the spring rate of springs 60 and 62 and the diameter of the valve is relatively large. Therefore, the air pressure change between a valve just cracked open to a fully opened valve is relatively small.

The reliability of the valve is assured by the use of the two spaced-apart valve supports comprising the disc-shaped end 100 of valve body 98 and the support member 126. For reliable action, a valve must never stick or refuse to open at the required time. Reliability is assured as the twin support points of the valve guide are less prone to fouling than a sleeve-type guide. Moreover, the glandless action improves reliability since the gum deposits associated with packing glands are not encountered.

The durability of valve 20 is increased since components, such as the diaphragm 30 and the springs 60 and 62, are not subject to the hot environment of the exhaust system. The heat flow path to diaphragm 30 is almost completely blocked since the diaphragm housing 28 is isolated from the hot valve body 98. While the valve stem 82 is connected to the diaphragm housing through support member 68, the stem is small in diameter and provides a very small flow path leading into housing 28, which provides a heat sink of large area protecting the diaphragm. Furthermore, the hot valve body 98 is connected to the pressure plate 94 only by the two posts 90 and 92. Again, they offer a small flow path and have only one point of contact each with the pressure plate. The use of two external springs instead of a single internal spring means that the springs are cooled by moving currents of ambient air.

Not only is valve 20 small and convenient when compared with some earlier valves, but it offers a much more convenient means of adjustment. A simple rotation of member 146 effects this adjustment.

What is claimed is:

1. The combination comprising a lift valve having a stem and a diaphragm housing having a cover plate peripherally sealed against the diaphragm, the cover plate having a pressure port communicating therethrough for receiving a pressurized fluid, a portion of the diaphragm housing extending away from the cover plate and towards the valve body, the valve stem being connected to said portion;
    a reciprocable member contacting a side of the diaphragm opposite the cover plate and being reciprocable towards and away from the cover plate;
    a valve body carrying the reciprocable member and having a valve seat and a discharge port therein;
    a valve closure member carried by the diaphragm housing;
    springs connecting the valve body to said portion of the diaphragm housing and resiliently biasing the valve body towards the diaphragm housing and biasing the valve seat into sealing engagement with the valve closure member, the valve closure member being movable away from the valve seat, to permit a fluid to pass between the closure member and the valve seat and out the discharge port, when the pressure fluid from the pressure port against the diaphragm and the pressure of fluid against the closure member are sufficient to deflect the springs;
    means for adjusting the tension of the springs comprising an annular member rotatably connected to the diaphragm housing, the annular member having a circumferentially extending sloping edge for each said spring, one end of each said spring engaging one said sloping surface, the annular member being rotated to adjust the tension; and
    an internal combustion engine equipped with a turbocharger, the pressure port being connected to a conduit supplying air from the turbocharger to the intake manifold of the engine, the valve being connected to an exhaust conduit between the engine and the turbocharger so that some exhaust gases from the engine are vented through the discharge port of the valve when the air from the turbocharger increases to a predetermined level.

2. A valve as claimed in claim 1, the tension springs being exterior to the valve body and the diaphragm housing.

3. A valve as claimed in claim 2, the tension springs comprising coil springs connected to the diaphragm housing near one end and connected to the valve body near another end.

4. A valve as claimed in claim 1, the portion of the diaphragm housing comprising an annular portion extending about the reciprocable member and away from the diaphragm.

5. A valve as claimed in claim 4 comprising a support member extending internally across the annular portion and being spaced-apart from the diaphragm, the stem of the lift valve being connected to the support member.

6. A valve as claimed in claim 1, the reciprocable member having a flat surface against the diaphragm.

7. A valve as claimed in claim 6, the reciprocable member comprising a pressure plate.

8. A valve as claimed in claim 7, the reciprocable member having a connecting portion interconnecting the valve body and the pressure plate, the connecting portion extending slidably through the diaphragm housing.

9. A valve as claimed in claim 8, the valve body being hollow, the connecting portion of the reciprocable member being connected near a closed end thereof and the closure member extending slidably through the closed end.

10. The combination comprising a valve and including a diaphragm;

a diaphragm housing having a cover plate peripherally sealed to the diaphragm with a pressure port communicating therethrough for receiving a pressurized fluid, a flange extending away from the diaphragm on the side opposite the cover plate and a support member extending internally across the flange;

a pressure plate having a flat surface against the diaphragm on a side thereof opposite the cover plate and having a connecting portion extending slidably through the diaphragm housing away from the diaphragm;

a lift valve having a stem connected to the support member and extending perpendicularly away from the diaphragm;

a valve body having a closed end facing the diaphragm and connected to the connecting portion of the pressure plate, the valve stem passing slidably through an aperture of the closed end, a valve seat spaced apart from the closed end for normally receiving the lift valve in sealing engagement and a discharge port between the valve seat and the closed end;

tension springs external of the valve body and the diaphragm resiliently biasing the valve body towards the diaphragm housing, the valve seat moving away from the diaphragm and the valve, to permit a fluid to pass between the valve and the valve seat and through the discharge port, when the pressure of a fluid from the discharge port against the diaphragm and the pressure plate plus pressure against the lift valve overcome the tension of the springs to move the valve body away from the diaphragm housing;

means for adjusting the tension of the springs comprising an annular member rotatably connected to the diaphragm housing, the annular member having a circumferentially extending sloping edge for each said spring, one end of each said spring engaging one said sloping edge, the annular member being rotated to adjust the tension; and an internal combustion engine equipped with a turbocharger, the pressure port being connected to a conduit supplying air from the turbocharger to the intake manifold of the engine, the valve being connected to an exhaust conduit between the engine and the turbocharger so that some exhaust gases from the engine are vented through the discharge port of the valve when the air from the turbocharger increases to a predetermined level.

11. A valve as claimed in claim 10, the cover plate comprising a disc, the flange of the diaphragm being annular and the valve body being cylindrical, the discharge port being at one side thereof.

12. A valve as claimed in claim 10, the support member comprising a disc spaced-apart from the diaphragm, the connecting portion of the pressure plate comprising stems extending slidably through apertures thereof.

13. A valve as claimed in claim 10, the valve body comprising an internal guide for the valve stem.

14. A valve as claimed in claim 13, the internal guide for the valve comprising two spaced apart valve supports having apertures slidably receiving the stem of the left valve.

* * * * *